United States Patent [19]
Griffis

[11] 3,964,791
[45] June 22, 1976

[54] LATERALLY TILTABLE TRUCK OR TRAILER DUMP BODY WITH HINGED SIDE PANELS AND HYDRAULICALLY OPERATED MEANS FOR OPENING EITHER SIDE PANEL AND AT DIFFERENT ELEVATIONS OF THE DUMP BODY

[75] Inventor: Juniper Griffis, Bowie, Tex.
[73] Assignee: Harold E. Lyst, Tulare, Calif.; a part interest
[22] Filed: May 12, 1975
[21] Appl. No.: 576,966

[52] U.S. Cl.................... 298/11; 298/17.6; 298/23 MD; 105/261 R; 214/502
[51] Int. Cl.² ........................................ B60P 1/28
[58] Field of Search............... 105/271, 272, 261 R, 105/273, 276; 298/10, 11, 13, 17.6, 17.5, 18, 17.7, 17.8, 22 R, 22 P, 23 MD, 35 M, 23 DF; 214/501, 502

[56] References Cited
UNITED STATES PATENTS
803,470  10/1905  Cope...................................... 298/11
1,462,417  11/1923  Mahlow................................ 298/11
3,730,591  5/1973  Griffis............................. 105/276 X FOREIGN PATENTS OR APPLICATIONS
1,172,966  6/1964  Germany........................... 298/17.7

Primary Examiner—Frank E. Werner
Attorney, Agent, or Firm—William R. Piper

[57] ABSTRACT

A laterally tiltable truck or trailer dump body with hinged side panels and hydraulically operated means for tilting the body laterally in the desired direction and for opening the side panel on the lower tilted side. The hydraulically operated means can also lift the dump body to a higher elevation in case the unloading area is at a height where this would be required. The hydraulic controls are preferably in the cab of the truck where they can be readily manipulated by the operator.

4 Claims, 6 Drawing Figures

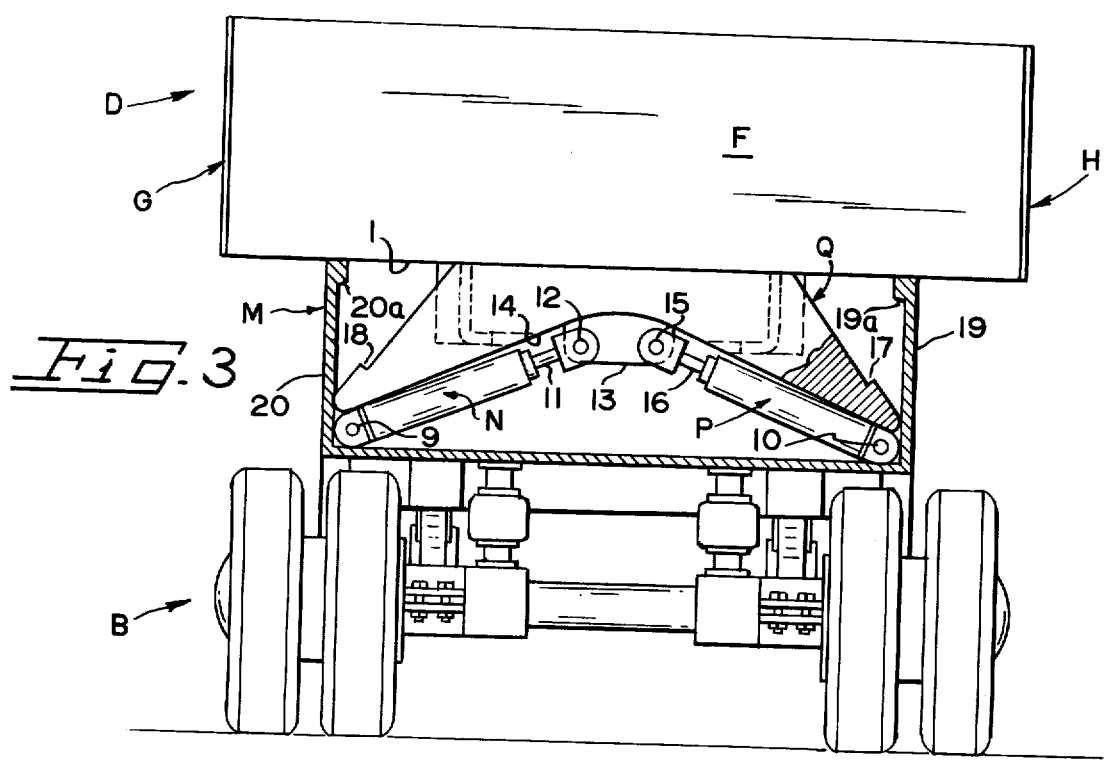
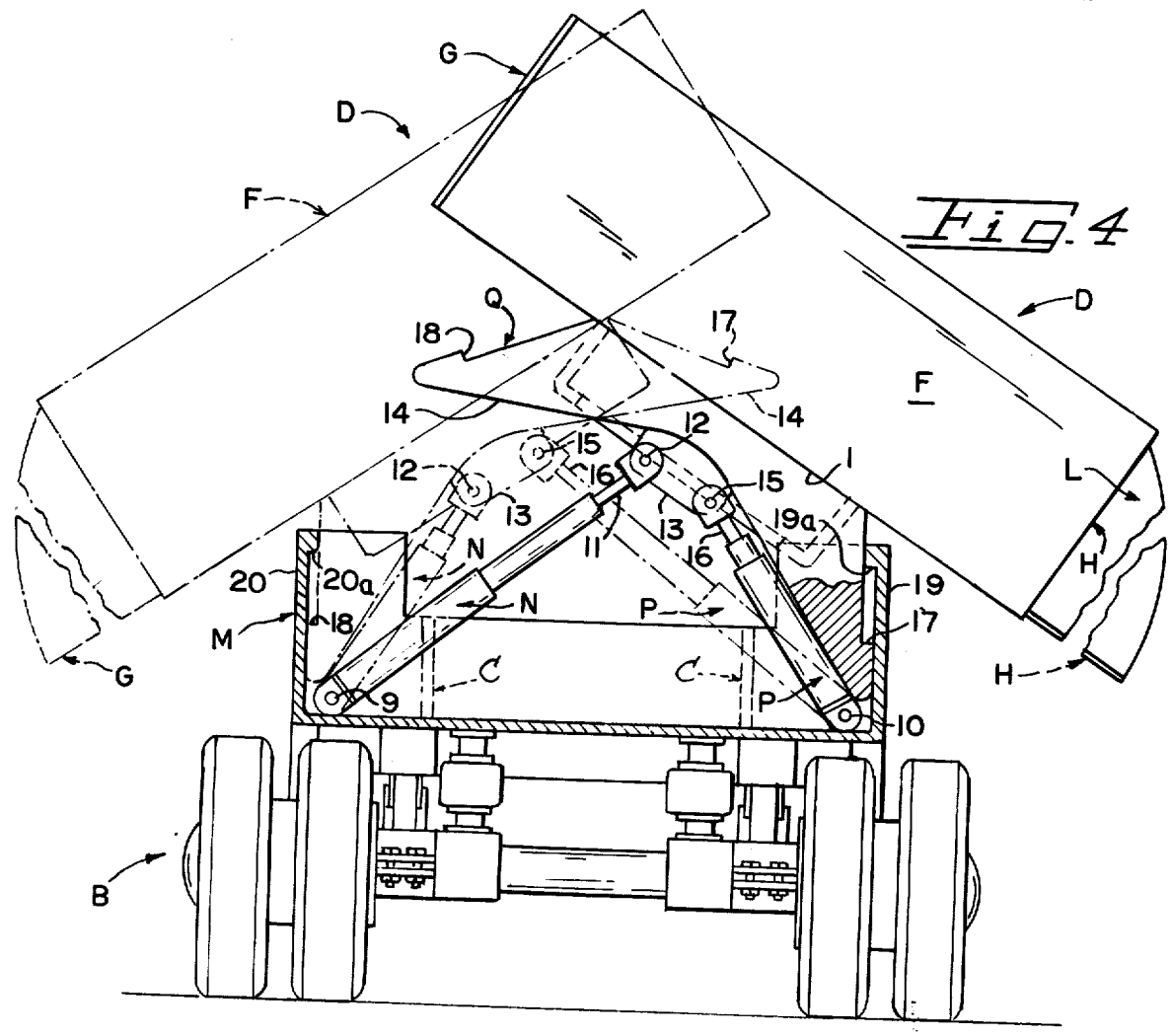

LATERALLY TILTABLE TRUCK OR TRAILER DUMP BODY WITH HINGED SIDE PANELS AND HYDRAULICALLY OPERATED MEANS FOR OPENING EITHER SIDE PANEL AND AT DIFFERENT ELEVATIONS OF THE DUMP BODY

SUMMARY OF THE INVENTION

This invention is an improvement over my U.S. Pat. No. 3,730,591, issued on May 1, 1973, and entitled Truck Or Trailer With Laterally Tiltable Dump Body And Hinged Side Panels Hydraulically Operated From Closed To Open Position. In the patent the front and rear end plates of the dump body housed hydraulic means that controlled the opening and closing of the hinged side panels for the body. Quadrantshaped members were secured to the ends of the side panels and were pivoted at the centers of the quadrants to the ends of the dump body. These quadrants were receivable in the end plates when the side panels were closed. The hydraulic means would permit the outward swinging of the quadrants connected to the side panel on the lower side of the dump body when it was tilted laterally so that this side panel would automatically swing open during the tilting operation. Also, the hydraulic means would swing the opened side panel back into closed position when the dump body assumed normal position. In addition, my patent disclosed intermediate quadrants secured to the side panels midway between the ends of the panels. Auxiliary hydraulic means operated these quadrants in synchrony with the end quadrants.

In my present invention I disclose novel hydraulically controlled means for raising the dump body to a higher elevation before tipping the dump body laterally. This feature permits the dump body to unload its material laterally and at a higher elevation if the platform or bin that is to receive the material is at a higher level than normal. This hydraulic means performs the same functions as in my patent, but in addition causes the dump body to move to a higher elevation before dumping laterally if this is needed.

BRIEF DESCRIPTION OF THE DRAWINGS

FIG. 3 is an enlarged transverse section taken along the line 3—3 of FIG. 1 and shows the dump body in normal position.

FIG. 4 is a view similar to FIG. 3 and shows the dump body tilted laterally to the right by full lines and tilted to the left by dot-dash lines.

FIG. 5 is a section taken along the line 5—5 of FIG. 1.

DESCRIPTION OF THE PREFERRED EMBODIMENT

Figure 1:
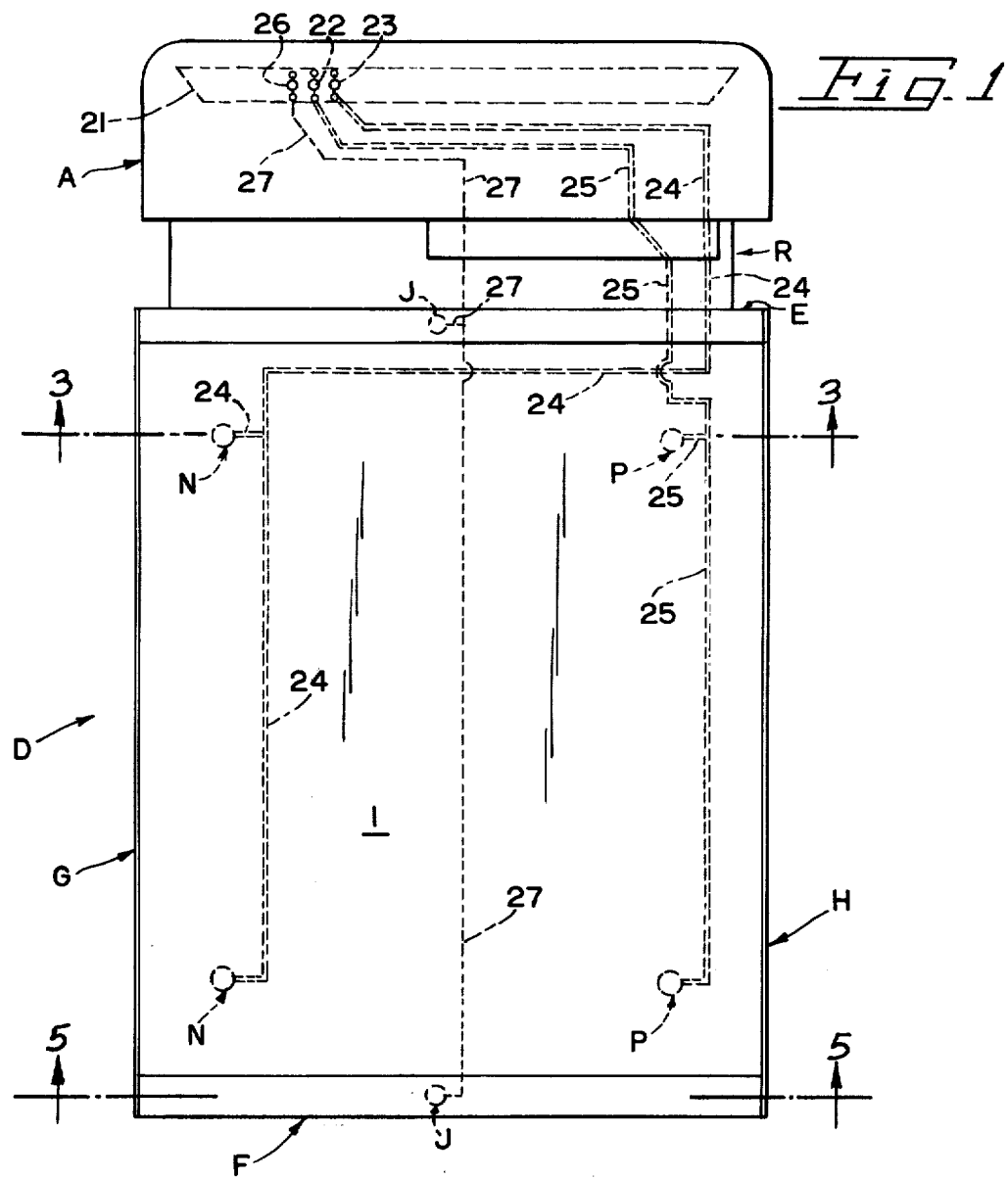
FIG. 1 is a schematic top plan view of a truck with a dump body and indicates the various hydraulic lines that lead to the hydraulic means for lifting the body before it is tilted laterally, this hydraulic means also permitting the side panel on the lower side of the tilted body to swing into open position.

In carrying out my invention, I make use of a standard truck, indicated schematically at A in FIG. 1, and the type of truck shown has the cab over the engine. Any type of truck may be used. The truck A may be removably connected to a trailer, indicated generally at B, and of any standard type. The trailer B includes a main frame with longitudinal members C, and a housing M at each end of the members. The purpose for the housing M will be explained hereinafter.

Figure 2:
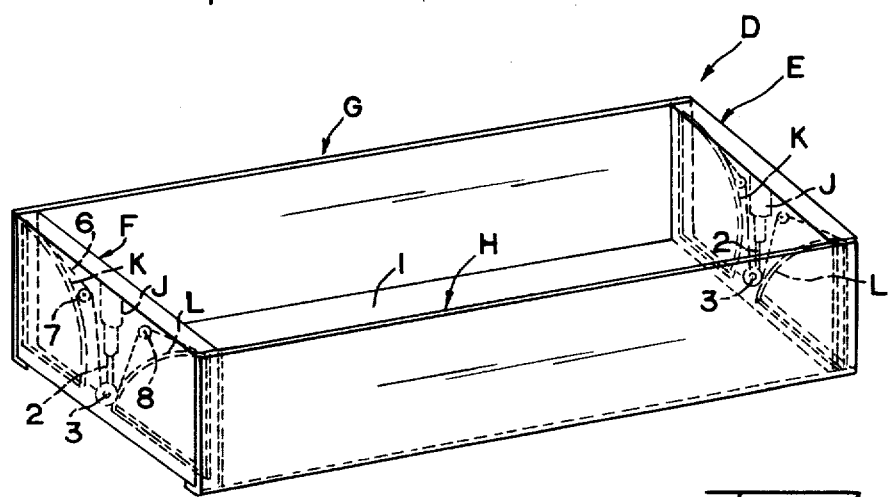
FIG. 2 is an isometric view of the dump body and illustrates by dotted lines the quadrants that are secured to the ends of the side panels and are swingable from inoperative or closed positions within the hollow end plates when the body is in normal position, into operative or extended positions beyond the lateral edges of the end plates when the side panels are swung into open position. It should be kept in mind that only the side panel on the lower side of the laterally tilted dump body is swung into open position while the side panel on the upper side remains closed.
Figure 5:
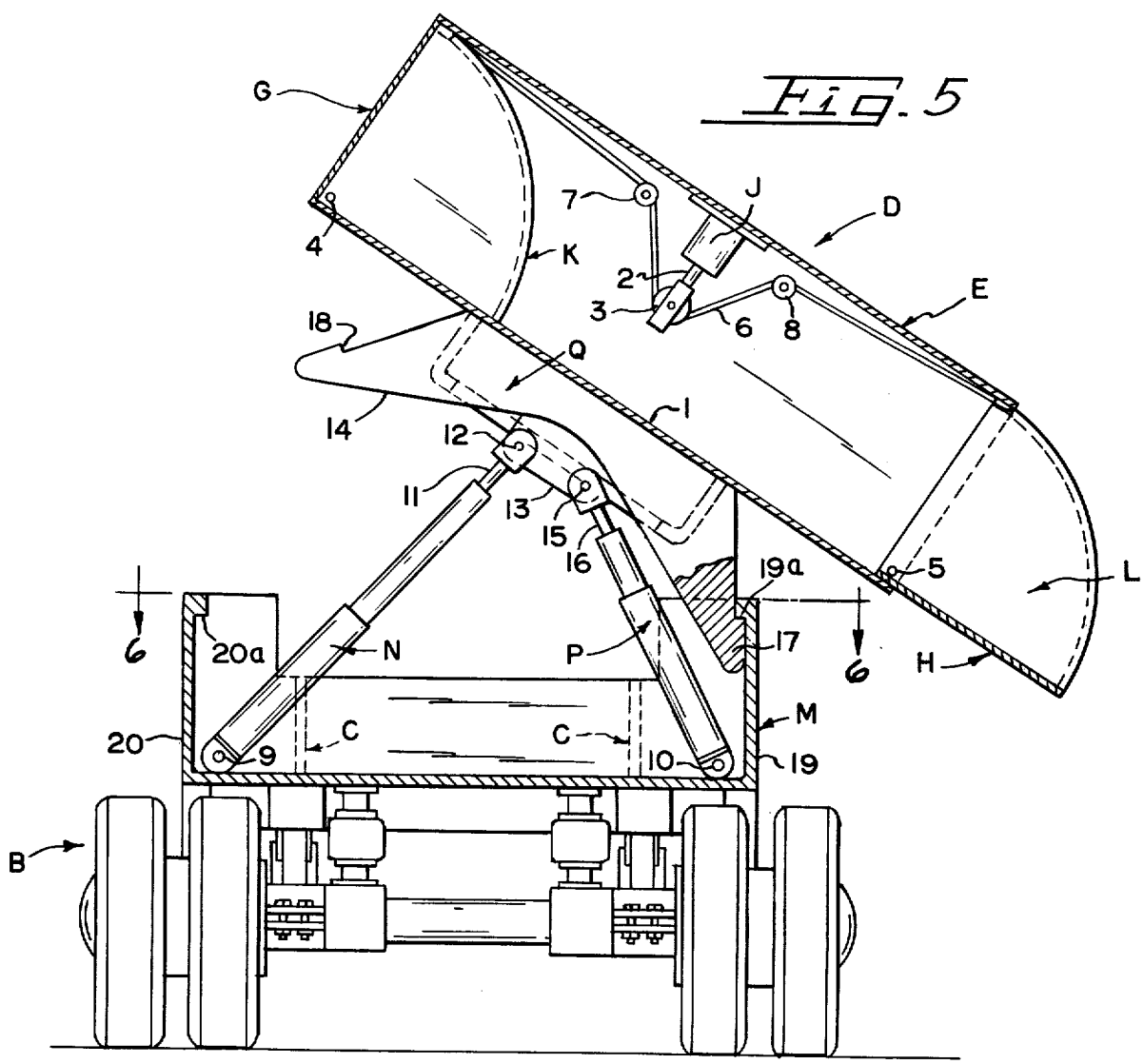
FIG. 5 is a view similar to FIG. 4, but shows the dump body raised to a higher elevation and then swung laterally to the right. This Figure also illustrates the hollow end plate in section to show one of the hydraulic means for opening and closing the side panels as the dump body is swung either to the right or to the left in a lateral direction.

FIG. 2 shows the dump body D with front and rear ends E and F, respectively. Both of these dump body ends are hollow and house hydraulic means for opening and closing side panels G and H that are hinged to the sides of the dump body bottom 1. Since the hyraulic means shown by dotted lines in the front and rear ends E and F of the dump body are of identical construction, a detailed description of the one illustrated in the front end E will suffice for both. Referring to FIG. 5, I show a cylinder J positioned in the center of the hollow end E of the dump body and this cylinder has a telescopic piston rod 2 extending therefrom and provided with a pulley 3 at its outer end. The side panel G has its ends secured to quadrant-shaped members K that are pivoted at 4 and are swingably received in the hollow dump body ends E and F. In like manner, the side panel H has its ends secured to quadrant-shaped members L that are pivoted at 5 and are swingably received in the hollow dump body ends E and F. The arcuate edges of the quadrants K and L are grooved to receive a cable 6, see FIG. 5, shows ends are secured to the quadrants adjacent to the side panels G and H, and the remaining portion of the cable extends over idler pulleys 7 and 8 and around the pulley 3. The cable 6 is of a predetermined length and when the telescopic piston rod 2 is fully extended, as shown in FIG. 2, the cable will hold the quadrants K and L and the side panels G and H in closed position. This hydraulic means for controlling the opening and closing of the side panels G and H of the dump body D is also shown in my U.S. Pat. No. 3,730,591. I will describe how the side panels function when I set forth the operation of the entire device.

I will now describe how the dump body D can be tilted laterally to the right or to the left and this is shown in FIGS. 3 and 4. I show the main frame C of the trailer B provided with a housing M in which a pair of hydraulic cylinders N and P are mounted. There are two such housings M, one being placed near the front of the dump body D and the other near the rear. The cylinders N and P have their lower ends pivotally mounted at 9 and 10 in the housing M. Each housing M has an open top and the bottom 1 of the dump body D rests on the tops of the housings M when the dump body is in normal position.

Figure 6:
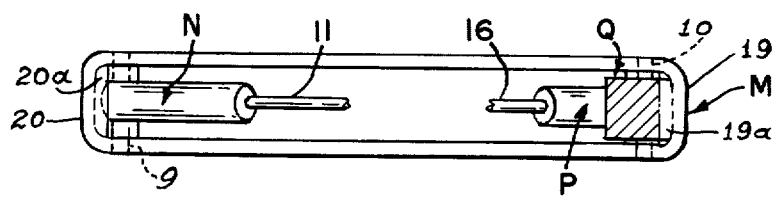
FIG. 6 is a horizontal section taken along the line 6—6 of FIG. 5, and it illustrates the housing in which one pair of the hydraulic cylinders and piston rods are used for tilting the dump body laterally and for raising the dump body to a higher elevation before tilting the body laterally.

FIG. 3 shows the dump body D with a large transversely extending plate Q depending from the bottom 1 of the body and projecting down into the housing M when the dump body is in normal position. A top plan view of one of the housings M is shown in FIG. 6 and the hydraulic cylinders N and P are shown as well as a portion of the transverse plate Q. When the operator wishes to tilt the dump body D to the right, as shown by the full line position in FIG. 4, he directs fluid into the cylinder N in a manner hereinafter described, and this fluid will move the piston and telescopic piston rod 11 for exerting an upward force on the plate Q and the dump body D because the outer end of the piston rod 11 is pivoted at 12 to a bracket 13 which in turn is secured to the central portion of the lower edge 14 of the plate Q. This upward thrust of the piston rod 11 on the bracket 13 will cause the bracket to swing on the pivot 15 that connects the bracket to the telescopic piston rod 16 of the hydraulic cylinder P. The swinging of the bracket 13 will swing the plate Q and tilt the dump body D to the right.

While this is taking place the operator will permit the fluid in the hydraulic cylinders J disposed in the hollow ends E and F to escape, as will be explained later, and this will permit the telescopic pistons 2 to contract and move the pulleys 3 toward the cylinders J and slacken the cables 6 whereupon the contents in the tilted dump body will bear against the side panel H, to swing it into open position, as shown in FIGS. 4 and 5. Note in FIG. 4 that the telescopic piston rod 16 has been moved just sufficiently to raise the pivot 15 so that the dump body D in tilting to the right will swing on the pivot 15 and not rock on the right hand end of the housing M. At the end of the lateral tilting operation of the dump body D, the dump body is returned to normal position by the fluid in the cylinders N being exhausted and the fluid being pumped into the cylinders J for causing the telescopic piston rods to extend and move the pulleys 3 for acting on the cables 6 for closing the side panel H. What I have described for a laterally tilting of the dump body D to the right in FIG. 4 and the opening of the side panel H, holds true when the dump body is tilted to the left except in this case the telescopic piston rods 16 are extended and the dump body D with its plates Q and brackets 13 will swing about the pivots 12. The side panel G will swing open instead of the side panel H.

In certain unloading areas the receiving platform, not shown, is at a higher elevation than the normal platform height which necessitates the raising of the dump body D to a higher point prior to swinging the dump body in a lateral direction. I accomplish this feature in a novel manner and FIG. 5 discloses the structure. The transversely extending plate Q that depends from the bottom 1 of the dump body D has a hook-shaped portion 17 at its right hand side and another hook-shaped portion 18 at its left hand side. The opposite ends 19 and 20 of the housings M have inwardly extending flanges 19a and 20a, respectively.

When the dump body D is in normal position, as shown in FIG. 3, the ends of the hook-shaped portions 17 and 18 slidably contact the inner surfaces of the end walls 19 and 20 of the housings M. During the lateral tilting of the dump body D to the right in FIG. 4, as previsouly explained, the plate Q will swing about the pivot 15 and the hook-shaped end 17 will remain substantially at the same elevation and merely swing from the position shown in FIG. 3 into that shown in FIG. 4.

However, when the dump body D is to be raised to a higher elevation before being tilted laterally, both the hydraulic cylinders N and P will have fluid forced into them for causing their telescopic piston rods 11 and 16 to extend. The piston rod 16 will lift the bracket 13 and the plate Q until the hook 17 engages with the flange 19a, as shown in FIG. 5. The hook 17 now prevents this end of the plate Q from moving any higher. The telescopie piston rod 11 continues to extend and will rock the bracket 13 about the pivot 15 and cause the plate Q and the dump body D to swing laterally to the right and at a higher elevation than that shown in FIG. 4. The side panel H will swing into open position in the manner previously described. The dump body D could be swung laterally to the left if desired and in this case the hook 18 would engage with the flange 20a. At the completion of the higher elevation of the dump body D being tilted to the right, the parts can be returned to normal position by exhausting the fluid from the cylinders N and P and by forcing fluid into the cylinders J for closing the side panel H.

OPERATION

From the foregoing description of the various parts of the invention, the operation thereof may be readily understood. In FIG. 1, I show schematically the various hydraulic lines leading to the different hydraulic cylinders so that three manually operated controls in the truck A will cause the pistons in the cylinders to actuate piston rods for tilting the dump body D laterally, for opening the side panel on the lower side of the tilted body, and for raising the body to a higher elevation, if necessary, before tipping it laterally.

The truck A in FIG. 1, has an instrument panel 21 and a pair of two-way hydraulic controls 22 and 23 are mounted in the panel. A fluid supply tank is shown at R, and the fluid pump is not shown. A hydraulic line, indicated by the double dash lines 24, extends from the two-way control unit 23 to the hydraulic cylinders N that are used for tilting the dump body D to the right in FIG. 4. The fluid pump, not shown, causes the fluid to flow from the tank R through the control 23 and to the cylinders N when the two-way control unit 23 is actuated by the operator, and the dump body will be tilted laterally to the right.

When the dump body D has been tilted to the right in FIG. 4, to the desired angle, which should not be more than 45° from the horizontal, the two-way control 23 is actuated to stop any further fluid flow into the cylinders N. This will stop any further lateral tilting of the dump body to the right. During this operation, the two-way control 22 can be actuated for a very short duration and fluid will flow from the tank R through the two-way control 22 and then through the double dotted line conduit 25 to the hydraulic cylinders P for moving the telescopic piston rods 16 only a slight distance for positioning the pivot 15 at a height which will cause the bottom 1 of the dump body to just clear the top of the housing M when the body is tilted laterally to the right.

The operator now actuates the two-way hydraulic control 26 on the panel 21 and fluid will flow through the line 27 shown by the single dash line from the central cylinders J in the hollow ends E and F of the dump body so that the telescopic piston rods 2 for these cylinders can retract and feed slack into the cables 6 for permitting the side panels H on the lower side of the tilted dump body to swing into open position.

After the dumping operation to the right in FIG. 4 has been completed, the operator actuates the two-way control 23 to permit the fluid in the cylinders N to return to the tank R by the lines 24 to bring the dump body D back into normal position. Also, he actuates the two-way control unit 22 to permit the small amount of fluid in the cylinders P to return to the tank R and thus cause the piston rod 16 to lower the pivot point 15 from the slightly raised position above the top of the housing M, see FIG. 4, into a position within the housing, see FIG. 3, where the dump body will be supported by the housings. At the same time the operator actuates the two-way control 26 for causing fluid to flow from the tank R, through the line 27 for entering the cylinders J and extending the telescopic piston rods 2 for moving the pulleys 3 and cables 6 for closing the side panel H.

It is possible to cause the dump body D to swing laterally to the left, as is shown in FIG. 4, by the dot-dash lines. In this case the operator actuates the two-way control unit 22 for causing the pump, not shown, to force fluid through the lines 25 for causing the cylinders P and their pistons to extend the piston rods 16 a great distance for swinging the dump body laterally to the left. Also, the two-way control 23 is actuated for causing the cylinders N to receive a small volume of fluid through the lines 24 for extending the piston rods a slight distance for raising the pivot 12 from a position within the housing M, see FIG. 3, to a position above the housing, see FIG. 4, so that the dump body will not contact the top of the housing during the tilting operation. The two-way control 26 will when actuated permit the fluid in the cylinders J to flow back into the tank R and the telescopic pistons 2 will contract and slacken the cables 6 so that the side panel G can swing into open position. The reverse procedure is followed when returning the dump body to normal position and closing the side panel G.

I have added a feature, already described in detail and not shown in my patent, which will permit the operator to raise the dump body D to a higher elevation before tilting the body laterally to the right or to the left. To carry out this operation, I will explain the operation only for the right hand tilting of the body, as shown in FIG. 5. The two-way control units 22 and 23 are held in operative position for a longer time period so that the piston rods 16 will lift the pivots 15 to a higher point above the housings M than that shown in FIG. 4 and until the hooks 17 on the plates Q contact the flanges 9a of the housings. When this takes place the operator actuates the control 23 to stop further flow of liquid into the cylinders P and permits more fluid to flow into the cylinders N so that the piston rods 11 will swing the dump body D to the right in FIG. 5. After this is accomplished the control unit 26 is actuated for permitting fluid in the cylinders J to flow back into the tank R, and this will feed slack into the cables 6 and allow the right hand panel H to swing into open position. The reverse procedure is followed when swinging the dump body from the position shown in FIG. 5, into the one shown in FIG. 3 and for closing the side gate H.

I claim:
1. A vehicle having a frame:
   a. a dump body mounted on said frame and having at least one transversely extending plate depending below the bottom of said body;
   b. said frame having a housing for receiving said transversely extending plate when said dump body rests on said frame, said housing having side walls with inwardly extending flanges at their upper ends;
   c. the ends of said transversely extending plate having hook-shaped portions that slidably contact with the inner surfaces of the housing side walls;
   d. hydraulic means for tilting said dump body laterally either to the right or to the left so as to incline the dump body from a horizontal position, said means including hydraulic cylinders with telescopic piston rods; and
   e. hydraulic valve controlled means for delivering added fluid to said cylinders for raising said dump body to a higher elevation, the operator controlling said valves for causing the desired hook-shaped portion of said plate to engage with its associate inwardly extending flange for stopping the raising of this end of said transverse plate;
   f. whereby the hydraulic means will act on said dump body to cause it to swing about the engaged hook-shaped portion and to tilt said body laterally into dumping position.

2. The combination as set forth in claim 1: and in which
   a. said body having a left and a right side gate hingedly connected to the two side edges of the body;
   b. hydraulic means for swinging the left side gate into open position when said dump body is tilted laterally to the left, and for swinging the right side gate into open position when said dump body is tilted laterally to the right; and
   c. hydraulic valve controlled means for operating said side gates for causing the side gate on the lower side of said dump body to swing into open position when said dump body is swung into a laterally inclined position.

3. The combination as set forth in claim 1: and in which
   a. the hydraulic cylinders of said hydraulic means for tilting said dump body laterally being pivotally mounted within said housing and having their telescopic piston rods pivotally associated with said transversely extending plate;
   b. whereby said hydraulic valve controlled means can be actuated by an operator for delivering fluid under pressure to said cylinders for causing said telescopic pistons to tilt said dump body laterally either to the right or to the left, or he can deliver additional fluid to said cylinders for raising said dump body to a higher elevation until the desired hook-shaped end of said transverse plate engages with its associate flange whereupon said plate will fulcrum about this flange as said piston rods swing said dump body laterally into a dumping position.

4. The combination as set forth in claim 3: and in which
   a. said body having a left and a right side gate hingedly connected to the two side edges of the body;
   b. hydraulic means for swinging the left side gate into open position when said dump body is tilted laterally to the left, and for swinging the right side gate into open position when said dump body is tilted laterally to the right; and
   c. hydraulic valve controlled means for operating said side gates for causing the side gate on the lower side of said dump body to swing into open position when said dump body is swung into a laterally inclined position.

* * * * *